United States Patent
Tseng et al.

(10) Patent No.: US 6,308,207 B1
(45) Date of Patent: *Oct. 23, 2001

(54) DISTRIBUTED SERVICE SUBSYSTEM ARCHITECTURE FOR DISTRIBUTED NETWORK MANAGEMENT

(75) Inventors: Weinan William Tseng, Poway; P. Keith Muller, San Diego; Kit Man Chow, Carlsbad; Michael William Meyer, Encinitas; Gregory DuVall Bruno, Carlsbad, all of CA (US)

(73) Assignee: NCR Corporation, Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/926,148

(22) Filed: Sep. 9, 1997

(51) Int. Cl.$^7$ .................................................. G06F 15/173
(52) U.S. Cl. ........................ 709/224; 709/223; 709/226; 370/254
(58) Field of Search ................................ 709/224, 223, 709/226, 202, 201, 220; 370/254, 257, 463

(56) References Cited

U.S. PATENT DOCUMENTS

| | | | |
|---|---|---|---|
| 5,485,576 | * | 1/1996 | Fee et al. ........................ 395/185.09 |
| 5,491,694 | * | 2/1996 | Oliver et al. ........................ 370/85.4 |
| 5,522,042 | * | 5/1996 | Fee et al. ............................. 709/226 |
| 5,522,046 | * | 5/1996 | McMillen et al. ................... 709/239 |
| 5,561,769 | * | 10/1996 | Kumar et al. .................... 395/200.05 |
| 5,606,664 | * | 2/1997 | Brown et al. ......................... 709/224 |
| 5,608,720 | * | 3/1997 | Biegel et al. ......................... 370/249 |
| 5,655,081 | * | 8/1997 | Bonnell et al. ................. 395/200.32 |
| 5,678,006 | * | 10/1997 | Valizadeh et al. ............. 395/200.02 |
| 5,751,963 | * | 5/1998 | Umetsu ................................ 709/223 |
| 5,812,771 | * | 9/1998 | Fee et al. ........................ 395/200.31 |
| 5,872,904 | * | 2/1999 | McIMillen et al. ..................... 714/4 |
| 5,913,037 | * | 6/1999 | Spofford et al. ..................... 709/226 |
| 5,996,010 | * | 11/1999 | Leong et al. ......................... 709/226 |
| 6,052,722 | * | 4/2000 | Taghadoss ........................... 709/223 |
| 6,067,585 | * | 4/2000 | Hoang ................................... 710/11 |
| 6,085,243 | * | 7/2000 | Fletcher et al. ...................... 709/224 |
| 6,108,782 | * | 8/2000 | Fletcher et al. ...................... 713/153 |
| 6,119,159 | * | 9/2000 | Tseng et al. .......................... 709/224 |
| 6,145,001 | * | 11/2000 | Scholl et al. ......................... 709/223 |

* cited by examiner

Primary Examiner—Robert B. Harrell
Assistant Examiner—William C. Vaughn, Jr.
(74) Attorney, Agent, or Firm—Gates & Cooper

(57) ABSTRACT

A distributed service subsystem comprises one or more cabinets containing one or more computer systems, one or more administration consoles for controlling the computer systems in the cabinets, and a network interconnecting the administration consoles and the cabinets. Each of the cabinets includes a cabinet module interface controller (CMIC) coupled to and controlling one or more chassis management boards (CMBs). The CMBs are each adapted to communicate with one or more managed components in the cabinet through a component specific interface.

12 Claims, 4 Drawing Sheets

DISTRIBUTED SERVICE SUBSYSTEM ARCHITECTURE FOR DISTRIBUTED NETWORK MANAGEMENT

CROSS-REFERENCE TO RELATED APPLICATION

This application is related to application Ser. No. 08/926,147, filed on same date herewith, by William Tseng et al., entitled "DISTRIBUTED SERVICE SUBSYSTEM PROTOCOL FOR COMPUTER SYSTEMS," which application is incorporated by reference herein.

BACKGROUND OF THE INVENTION

1. Field of the Invention

This invention relates in general to computer systems, and in particular to systems management of computer systems.

2. Description of Related Art

Large enterprise computer systems are a very difficult environment to manage. System management must not only handle a wide range of events, such as power failures, fan failures, disk failures, complex status changes (such as rebooting), etc., it must also handle them in parallel across a large number of computer systems and cabinets, some of which may be geographically remote.

System management for large enterprise computer systems is complex, because not only does it have to detect failures, but it must quickly notify every part of the system that may be impacted by this failure. In a large system, it is extremely difficult to determine the impact of an event without an intimate and detailed knowledge of the system. When the system is large, the logistics involved in the distribution of events (even when the system management knows to "whom" to send these events) is no longer simple, straight-forward, or low cost.

Even processing a single event in a large system can become quite complex. That single event may need to be processed concurrently by several different processes in order to meet the reliability and serviceability goals required by the "glass house" computing market. For example, one process may communicate the data in the event to the user via a system console. Yet another process may use the same event to build a knowledge base for predicting specific component failure in a system as a method for improving system availability.

The management of large enterprise computer systems has traditionally been based on a centralized, monolithic design which uses point-to-point communication to connect a single administration console to the set of managed computer systems. However, this centralized approach imposes scalability and connectivity limits that in turn limits how large the computer systems can grow, and is vulnerable to single point of failure, since a backup console is not possible. The monolithic nature of the centralized approach does not easily adapt to change.

Further, since the system console is the centralized collection point for events, applications which extract data from the events in real-time tend to be located on the system console for performance issues. As event processing becomes more complex (to extract more information out of the event and perform more processing on them) and the number of events increases with larger and faster systems, the resources of the central collection point, the console, are very quickly consumed. The end result of this is clearly visible to the customer through the severe performance impact on console management and display functions.

One problem with this centralized model is that it couples the performance of system management to a component (the console) whose performance does not scale automatically whenever the system is expanded (with additional or more powerful systems). Another problem is that a centralized event distribution system may create a single point of failure that could require significant software and hardware expenditures to eliminate.

Thus, there is a need in the art for an infrastructure or architecture that provides efficient distribution of events across every computer system and cabinet.

SUMMARY OF THE INVENTION

The present invention discloses a distributed service subsystem that comprises one or more cabinets containing one or more computer systems, one or more administration consoles for controlling the computer systems in the cabinets, and a network interconnecting the administration consoles and the cabinets. Each of the cabinets includes a cabinet module interface controller (CMIC) coupled to and controlling one or more chassis management boards (CMBs). The CMBs are each adapted to communicate with one or more managed components in the cabinet through a component specific interface.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The goal of the Distributed Service Subsystem of the present invention is to provide a design for system management that can be used with a range of systems from small computers to large enterprise computing networks. The Distributed Service Subsystem introduces a paradigm shift in the service subsystem design that is based on a non-traditional, distributed approach that provides the necessary scalability in the Distributed Service Subsystem for monitoring very large systems. The hierarchical architecture of the Distributed Service Subsystem provides the required scalability to manage large computer systems. Moreover, the architecture of the present invention remains independent of the structure of the monitored computer systems.

Figure 1:
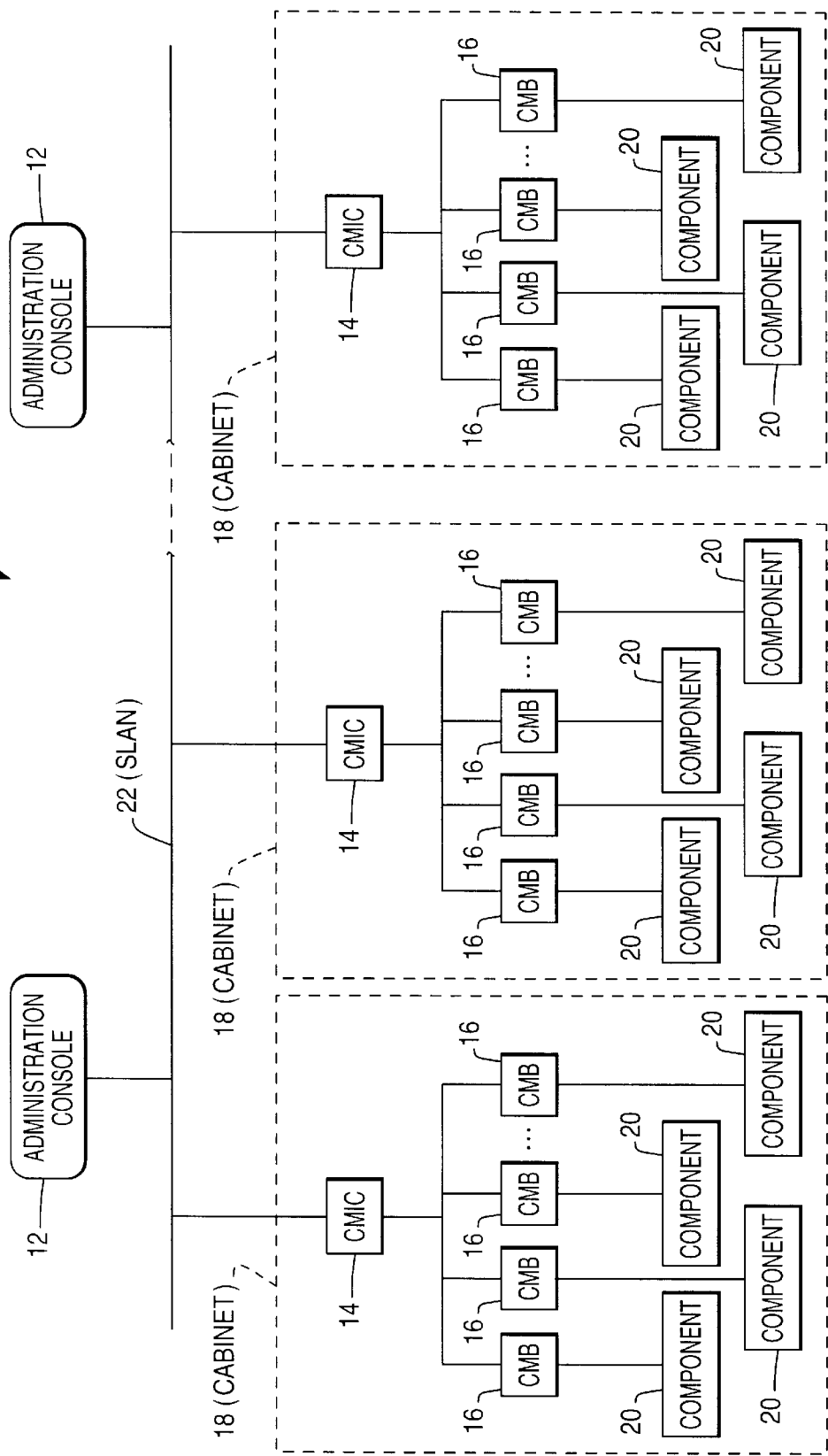
FIG. 1 is an exemplary illustration of a distributed service subsystem in an exemplary computing environment.

FIG. 1 is a block diagram that illustrates the Distributed Service Subsystem 10 of the present invention. The present invention introduces a paradigm shift in service subsystem design for networked computer systems that addresses all of the limitations and deficiencies in the traditional centralized approach.

The Distributed Service Subsystem 10 is based on distributing the system management workload from a centralized location, the Administration Console 12, to many distributed management components. These management components include a Cabinet Module Interface Controller (CMIC) 14 coupled to and controlling one or more Chassis Management Boards (CMB) 16. Both the CMIC 14 and CMB 16 are embedded controllers that are configured in a hierarchy to form the foundation for the Distributed Service Subsystem 10.

The CMIC 14 offloads the management functions required of the Administration Console 12 and isolates the managed components of a Cabinet 18 from the rest of the Distributed Service Subsystem 10. The CMBs 16 are adapted to communicate with the managed components 20 through component 20 specific interfaces that preclude the need for the managed components 20 to adapt to the Distributed Service Subsystem 10.

The basic role of the Distributed Service Subsystem 10 is to manage and control one or more complexes residing in one or more Cabinets 18, wherein each complex is a collection of related components 20, e.g., a logically separate computer system. Both the number and type of components 20 in a single Cabinet 18 can be varied. Moreover, a set of Cabinets 18 can be grouped into any combination of one or more interconnected complexes, all of which must be managed by the Distributed Service Subsystem 10. The Distributed Service Subsystem 10 must support these groups of Cabinets 18 in a large enterprise and provide support for one or more Administration Consoles 12 per system and one or more systems per Administration Console 12.

The Administration Console 12 in the centralized approach is the limiting factor in how large a system can grow, since it cannot readily scale due to limited processing power and I/O connectivity. The Administration Console 12 in the present invention, however, can offload and distribute management functions to the CMICs 14 and CMBs 16 by issuing management commands on a System Local Area Network (SLAN) 22, which is a local area network that supports a connectionless-style of communication used in the messaging protocol provided by the present invention.

In addition to offloading the work from the Administration Console 12, the CMICs 14 along with the CMBs 16 isolate the managed components 20 from the Distributed Service Subsystem 10. The CMIC 14 interfaces to the SLAN 22 on behalf of the Cabinet 18, such that components 20 within the Cabinet 18 do not need to be cognizant of the SLAN 22 or its protocol. Management functions are further distributed within a Cabinet 18 to the different CMBs 16, which are adapted to communicate to a managed component 20 type through a component 20 specific interface. The CMBs 16 are controlled by the CMIC 14 through direct connection to the CMICs 14, as described further herein below.

The Distributed Service Subsystem 10 has been designed to protect investments in computer systems by allowing components 20 to be upgraded in existing Cabinets 18. Since the configuration of a Cabinet 18 can change over time, the Distributed Service Subsystem 10 must remain flexible with respect to specific component 20 management. Not only does platform management have to control current components 20, but it must be able to adapt to future components 20 without extensive hardware or software upgrades.

The Distributed Service Subsystem 10 also greatly simplifies introducing new components 20 and technologies into a networked computer system as the Administration Console 12 and the new components 20 are not impacted; the only development required is isolated to adapting a new CMB 16 to communicate with the new type of component 20. The new components 20, as is true with all managed components 20, do not have to be cognizant of the protocols used by the Distributed Service Subsystem 10 nor be cognizant that they are part of a large integrated system.

System Management Local Area Network (SLAN)

The SLAN 22 is a communications mechanism with no limit on the number of listening or sending agents or devices thereon. Thus, system management is no longer restricted to a specific physical device such as a system console. Instead, any agent which understands how to send and receive event messages can perform system management functions. Moreover, system management software can run on any processing node that has access to send and receive event messages on the SLAN 22.

In the preferred embodiment, the SLAN 22 is a single segment Ethernet-based LAN. A single segment Ethernet LAN eliminates all the reliability problems associated with UDP (datagram) protocols, such as packet loss on store and forward routers, because proper transmission of a message can be detected by the Ethernet hardware. In this model, event messages map into UDP broadcast/multicast/point-to-point operations.

The SLAN 22 uses a connectionless-style protocol (discussed in more detail below) that allows a sender to distribute a message to all interested listeners without having to know who the interested listeners are. The connectionless-style protocol greatly reduces complexity since there are no connections to manage. The cost of distributing a message through the connectionless-style protocol does not increase with the system size. For example, a global command such as "System Power Off" can be issued once from the Administration Console 12 independent of the number of Cabinets 18 being managed. The connectionless-style protocol also enables other management agents to coexist on the SLAN 22, which may include redundant Administration Consoles 12. In contrast, connection-oriented protocols work well in small manageable numbers of nodes but, as the size of the system increases, the complexity and the overhead of managing the connections grow.

In the present invention, all system event messages are broadcast, multicast, or pointcast (point-to-point) onto the SLAN 22 using a well-defined format by one or more "stations". These system event messages are available to any "listener" who knows how to "tune in" to the desired communications (the communications is the stream of system event messages).

The agents in this model can be partitioned into two different categories: those agents which broadcast, multicast, or pointcast event messages are called event-sending agents; and those agents which listen for (and process) event messages are called event-listening agents. Agents are not restricted to the Administration Console 12; instead, any device which has access to the SLAN 22 can be authorized to support sending and listening agents.

The role of an event-sending agent is to alert listening agents whenever an important event has occurred within any complex or component 20. An event-sending agent may be a power system, a disk array controller, a process on a node, etc. An event-sending agent does not need to know how many listening agents there are, where they are located, or how they process the event messages. It is the responsibility of the event-listening agent to either discard or act on each event message as appropriate.

For example, an event-listening agent may be part of a display system for the Administration Console 12, which might react to specific events by changing the color of an icon on the console 12. Another example is an event-listening agent located on a node that alerts a database system in response to an event indicating a disk array in a remote Cabinet 18 going to battery power.

The advantage of the Distributed Service Subsystem 10 is that it reduces complexity and improves scalability for several reasons. The sending agent does not know the identity, the number of listening agents, or the appropriate reaction to an event in order to distribute the message. This greatly reduces the complexity of the sending agent software and message distribution cost is far less dependent on the number of listeners. The present invention remains flexible because system management features are the function of the listening agents and not of the sending agents. When new features need to be added to the Distributed Service Subsystem 10, it can be accomplished by either adding new listeners or modifying existing listeners with little impact on the event-sending agents.

Since feature implementation is the primary function of a listening agent, the system management load can be controlled by listening agent placement. For example, resource-intensive features can be isolated by placing the appropriate listening agents onto dedicated processing nodes. These processing nodes are added to the SLAN 22 to directly support those resource intensive features. In the present invention, not only does the performance of message distribution scale with system size, but new features which operate on message data can be added to the system with little impact on the performance of the existing listening agents.

Cabinet Module Interface Controller (CMIC)

Central to the present invention is the cabinet-level hardware controller called the Cabinet Module Interface Controller (CMIC) 14. The CMIC 14 is the communication and control "glue" which represents the complexes in a Cabinet 18 to the rest of the system. The CMIC 14 provides the hardware and software interfaces which can be configured to meet the interface requirements of each complex. The CMIC 14 provides the communication and control path for complex management into a seamless and uniform interface for the management software executed by the Administration Console 12. The CMIC 14 can control complexes that were designed to operate in a stand-alone configuration and integrate them into a single system operational view with little or no modification.

Each CMIC 14 is responsible for cabinet-level management and message distribution for each complex in a Cabinet 18. The CMIC 14 provides the communication path between the SLAN 22 and a CMB 16 through a combination of RS-232, RS-485, digital I/O lines, etc. When an event message is generated by a CMB 16, it is sent to the CMIC 14. For some CMBs 16, the CMIC 14 may have to poll for status and create an event message for the complex.

The CMIC 14 glues the individual complexes into a single system by adding identity information (such as complex and Cabinet 18 identifiers, complex type, time stamp, system name, etc.) to each event message and then broadcasts (or multicasts or pointcasts) the event message over the SLAN 22. In some cases, the CMIC 14 may perform a limited analysis of the event data from the CMB 16 before it creates an event message.

However, CMIC 14 event analysis should be limited. Expensive event analysis is best performed by an event-listening agent, so system management performance is not impacted. Event analysis should be limited (if possible) to simple complexes that do not produce output which needs extensive processing or state storage to detect events.

The CMIC 14 communicates to the Administration Console 12 as both a sending and receiving agent. Just as any other listening agent, the Administration Console 12 may act on event messages transmitted by the CMIC 14 to alert an operator of any change in system status. Moreover, the operator can use the Administration Console 12 to control a system by using the SLAN 22 to distribute the command.

The Administration Console 12 software routes commands to a specific complex or set of complexes by sending a command event message to the appropriate CMICs 14 using either pointcast, broadcast, or multicast managers. When the event message is received, the CMIC 14 converts these Administration Console 12 command event messages into the component 20 specific language or signals as required, and then routes the command to the CMBs 16 as specified by the command event. Components 20 are specified in a command event message by either complex identity (location in a Cabinet 18) or by complex type. A single event message may be processed by multiple CMICs 14 in parallel and each CMIC 14 may send that single event message to a number of components 20. This parallel event message distribution method enables the Distributed Service Subsystem 10 to distribute load and to scale performance proportional to the size of the system.

Complexes

Each complex type in a Cabinet 18 may have a different communication and/or control interface. The CMIC 14 must know the complex type before it can control or even power up a complex. A CMIC 14 might communicate with one type of complex via RS-232 using a control language unique to that complex. For another complex type, it might use a specific combination of digital I/O lines. In order to integrate Cabinet 18 complexes into a single system view, the CMIC 14 must adapt to the complex interface (both hardware and software), rather than adapting the complex to the CMIC 14.

This interface philosophy was chosen because it does not limit the system to only those complexes which can be modified to an interface designed for the CMIC 14. To further enhance flexibility, the CMIC 14 does not require a configuration database. When the CMIC 14 powers up, it determines which CMIC 14 ports are connected to a complex and what kind of complex they are connected to before any complex is powered up.

The CMIC 14 is not limited to just providing event message distribution and complex management services. Since the SLAN 22 is Ethernet-based, the CMIC 14 can be used to tap into the wide range of network services bundled with standard TCP and UDP implementations.

In this environment, it cannot be assumed that every complex will have the hardware and the software necessary to use these services. It will be the role of the CMIC 14 to proxy for them. Typical network services a complex might want to use include: booting, file transfer, and boot path modification.

For example, a complex may have a time window during boot for configuration updates that can be translated into standard network service by the CMIC 14. In this case, the CMIC 14 could translate this configuration option request into standard boot and file transfer requests by acting as a proxy agent for the complex.

A typical example is a complex which finds that it cannot boot from disk but can obtain a boot image over a serial line from the CMIC 14. The CMIC 14 will respond to the boot request with a boot path modification followed by a file transfer while acting as a proxy agent for the complex. The CMIC 14 will send the image to the complex by reading it from a network server over the SLAN 22 and writing it over the RS-232 link. On the complex side, it copies the executable image from the RS 232 into memory. The complex does not know that it is doing a network-based boot, it is just getting an executable image over a serial port. On the complex, the CMIC 14 will be able to act as transport agent to provide network access to applications that need access to the Console 12 or to all the other nodes in the system.

CMIC/Complex Addressing

The physical Ethernet address, as well as the logical Internet Protocol (IP) address, can be used to identify a particular CMIC 14. However, an Ethernet address is not easy for a customer to use or remember as the name for a particular Cabinet 18. When faults occur, the customer may need to physically locate the Cabinet 18 (or group of Cabinets 18). This requires that the customer be able to assign a unique name to each Cabinet 18.

A Cabinet 18 name may be a grid location on the machine room floor such as "AA03", a name like "Jetsons", or whatever the operator desires. This Cabinet 18 name is stored electronically in memory on the CMIC 14 (along with the rest of the CMIC 14 configuration data) and displayed electronically on the front of the Cabinet 18 by the CMIC 14. Internally, the CMIC 14 could be assigned an integer value to reduce the size of the event messages (instead of an ASCII string), but the customer must only see the Cabinet 18 name.

To reduce cost even further, a single CMIC 14 may be required to control a number of Cabinets 18, called a Cabinet Group. Each Cabinet 18 in the Cabinet Group is numbered from 0 to N. The CMIC 14 may be located in Cabinet 0 of the Cabinet Group. In a Cabinet Group, the customer-assigned Cabinet 18 name becomes the Cabinet 18 base name. A single Cabinet 18 in a Cabinet 18 group is identified by a concatenation of the Cabinet 18 base name, a "." and the Cabinet 18 number. For example "Quark.0" is the name for Cabinet 18 number 0 in a Cabinet group with the Cabinet 18 base name "Quark".

A system may contain multiple Cabinets 18 with multiple complexes in each Cabinet 18. Customer support must be able to locate a failed complex quickly. The present invention reduces the chance of wrong complex being replaced by making it clear which Cabinet 18 and then which complex in that Cabinet 18 contains the fault. Complex naming is further complicated because a Cabinet 18 may contain multiple instances of a specific type of complex. The Cabinet 18 name may only narrow the problem down to a single Cabinet 18. The present invention still must provide a cleat method to identify each and every complex within a Cabinet 18.

Assigning complex location information in a Cabinet 18 is extremely difficult to do. From the view of the CMIC 14, all that is known about a complex is its type and communications address. There is no hardware keys that describe where a complex is physically located in the Cabinet 18. To work around this, the Distributed Service Subsystem 10 combines a complex cabling scheme with a naming convention to clearly identify the complex physically in the Cabinet 18.

Complexes are dynamically assigned a Complex ID based on the physical cabling of the complex in the Cabinet 18 (from the cabling, location can be deduced). The Complex ID is combined with the complex type to determine the name of each complex in a Cabinet 18. Complex names are derived from the front side first and then on the back side of the Cabinet 18. On each Cabinet 18 side, complexes are labeled from left to tight and then top to bottom from the front side to the back of the Cabinet 18.

For example, consider a Cabinet 18 that contains four complexes. The top and leftmost complex is called complex A, the complex to the right of it (and at the same level and in the same complex bay) is called complex B, and so on. This same ordering sequences exists for every complex type with the "first" instance of a complex being the "A" unit, the next one is the "B" unit. These are the "human" readable names assigned to each complex (as might be displayed on the Administration Console 12).

This naming scheme allows a customer to physically locate a complex in a specific Cabinet 18. Internally to the Distributed Service Subsystem 10 software, complexes are represented by a fixed numbering scheme that is a direct map to the complex name. Each complex in a Cabinet 18 is assigned a number from 0 to N based on the combination of type of the complex and where it is located in the Cabinet 18 (or stated different based on the complex name).

The complex ID is what is encoded in the event messages sent to and from the CMIC 14. The Complex name is what this value decodes to when the event message is converted to a human-readable format (as the Administration Console 12 will do).

Multiple systems may share a single SLAN 22. A collection of Cabinets 18 can be given a single system ID. Or stated another way, multiple systems can share a common SLAN 22 (so Administration Consoles 12 can control multiple systems; or maybe a hot backup machine). Addressing all the Cabinets 18 in a single system is the role of the system ID.

A single system will be assigned a multicast group unless multicasting is not supported. Without multicast, the system ID in an event message is used to filter messages by system. A system is identified by an integer value or system ID. System ID's on a single SLAN 22 are unique for each system and may be used to specify the multicast group address.

System ID's should be different universally as it is not customer visible. The system ID maps to a user specified string called the system name, which generally appear on the Administration Console 12. Multicast IP is only needed for SLANs 22 that contain more than one large system (and is for performance only).

Event messages sent to and from a CMIC 14 (when destined for a specific complex) are routed based on the unique tuple <System ID, Cabinet ID, Complex ID>. The CMIC 14 maps a complex ID to a specific communications address.

In a preferred embodiment, the complex ID increases with port number of the CMIC 14. For example, complex A is connected to CMIC 14 port 0, complex B to CMIC 14 port 1, etc. Complexes with multiple ports may be assigned a complex ID for each port. Although the complex specifies its type, it is the connection to which CMIC 14 port that determines the complex ID for the complex.

Communications Protocol

The communications protocol used to transmit messages across the SLAN 22 between, for example, the Administration Console 12 (or other entity) and the CMICs 14 is an independent message interface.

Figure 2:
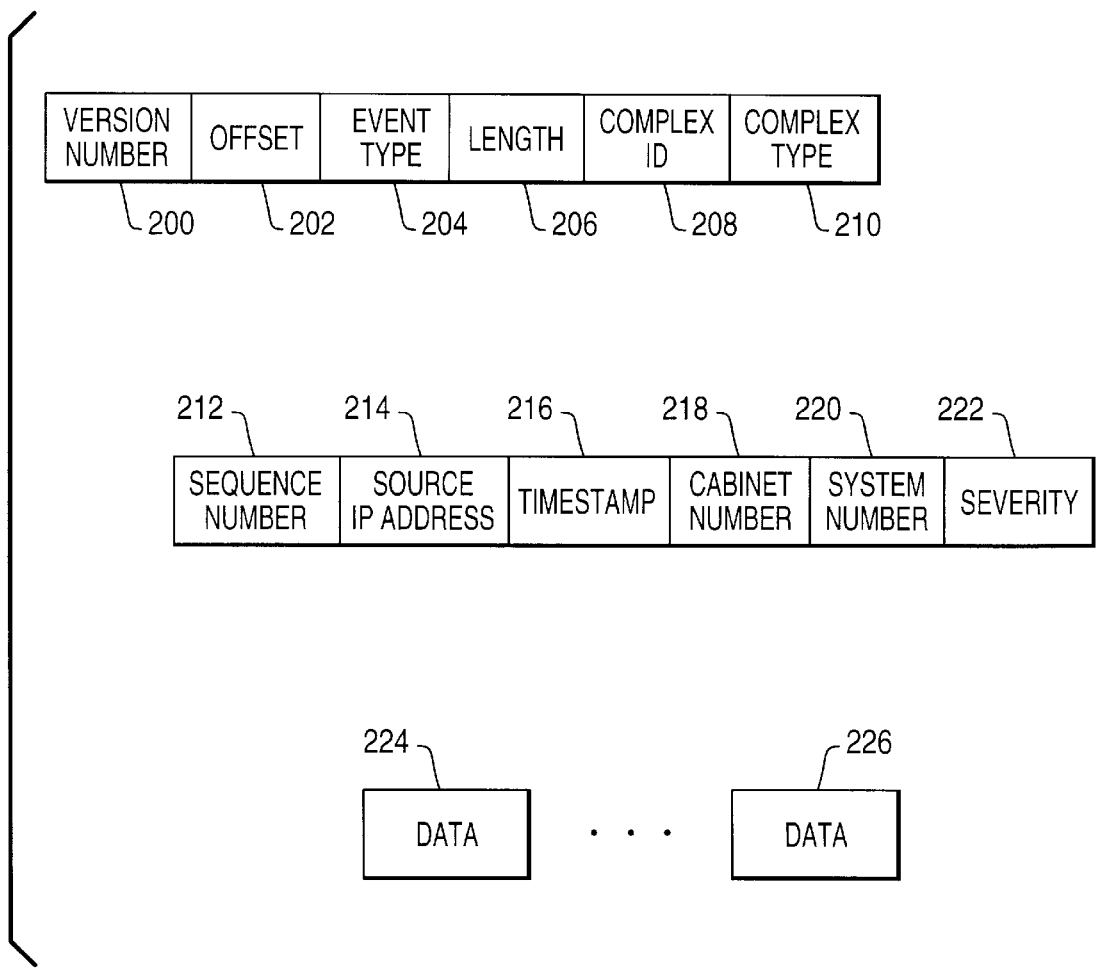
FIG. 2 is a block diagram that illustrates the format of a message header used in each message.

FIG. 2 is a block diagram that illustrates the format of a message header used in each SLAN 22 message, wherein the header includes a version number 200, offset 202, event type 204, length 206, complex ID 208, complex type 210, sequence number 212, source IP address 214, timestamp 216, cabinet number 218, system number 220, severity 222, and data portions 224–226 immediately follow the header. The various fields of the message header are described in more detail below.

Version Number

This field contains the version number that indicates the format of the message.

Offset

This field contains the offset value that indicates the length of the message header.

Event Type

This field contains an event type value, which are described in more detail below, that defines the types of messages transmitted on the SLAN 22:

(1) Critical Event messages: These message types are broadcast to report critical information from one or more components 20. Critical information indicates potential failures, such as power failure, component 20 failures, complex failures, over-temperature, etc. In general, critical event messages usually contain information that may need to be acted on quickly.

(2) Informational Event messages: These message types are broadcast to report non-critical information from one or more components 20. Informational events generally comprise logs, status messages and events whose grade is not known. In general, the CMB 16 transmits a fully-set-up message to the CMIC 14, wherein the CMIC 14 modifies or adds some fields, like the Cabinet 18 name.

(3) Command Event message: This message type is broadcast to direct one or more listening agents to command them to perform some function. Command event messages are dispatched from an Administration Console 12 or other sending agent and are acted on by CMICs 14, CMBs 16, components 20, or other listening agents, wherein the listening agent may be a proxy and forward the command to another listening agent as required. Command event messages allow some fields of the header to be "wild-carded", so a group of listening agents can be identified by complex type, system name, etc. This allows, for example, an Administration Console 12 to operate on same type of listening agent in multiple Cabinets 18 in parallel, e.g., all complexes of type X on system A, all disk arrays in cabinet B, etc.

(4) Command Completion Event message: This message is generated in response to a command event message that was acted upon by a listening agent. Command completion event messages generally contain the returned status after a command event message has been processed, although not all command event messages generate a command completion event message. The data portion of a command completion event message contains the sequence number of the command event message and the sequence number field of the header contains the sequence number of the command completion event message itself. The sending agent ACKs the command completion event message received from the listening agent.

(5) Acknowledge (ACK) message: This message is generated upon receipt of a critical event message, information event message, command event message, or command completion event messages. It is used to detect when a listening agent has not received a message.

(6) Heartbeat message: This message type contains identity information about a sending agent attached to the SLAN 22 and is broadcast at a predefined rate when the sending agent is attached to the SLAN 22 and is active. This message type is used to dynamically determine what entities are actively part of the SLAN 22 configuration and to detect failures among these sending agents.

Length

This field contains the length in bytes of the data section following the message header.

Complex ID

This field contains the identifier value for the complex in a Cabinet 18 that generated the event message or is the destination of the event message. This field is added by the CMIC 14 for event messages sent to it by the complexes and routed to the SLAN 22. It is also set by the Administration Console 12 as part of the destination address in a command event message.

Complex Type

This field specifies the type of complex that generated the event message or is the destination for the event message. The complex type field allows a command event message to specify all complexes of a specific type in a Cabinet 18. Alternatively, the complex type field allows a command event message to specify that complex type be ignored.

In a command event message, the Cabinet 18 is specified by Internet Protocol (IP) addressing (either directly to the CMIC 14 for a single Cabinet 18 or a broadcast/multicast for a group of Cabinets 18). The CMIC 14 then distributes the command event messages that specify a complex type to all complexes of that type within the Cabinet 18.

Generally, the complex ID and complex type are never both set. The complex ID specifies a single complex, while the complex type specifies one or more complexes.

Sequence Number

This field contains a monotonically increasing sequence number and is assigned by the sending agent that distributes the message on the SLAN 22. This is used by listening agents to identify duplicate event messages.

Source IP Address

This field contains the IP address of the sending agent on the SLAN 22. While this does not have to be in the event message, since it can be obtained via normal IP processing, having such information supports remote proxy functions and allows listening agents to know the exact source of the message.

Timestamp

This field contains the time when the event was recorded (or when the CMIC 14 first received the event message from a complex). This allows a listening agent to sort the messages by time and to record event messages from multiple sending agents by time.

Cabinet Number

This field specifies the Cabinet 18 where the event message came from or is being sent to. It can also be considered as the "address" of the CMIC 14, which is the event message router for that Cabinet 18. A name-lookup function using a domain name server (DNS) uses the Cabinet 18 name to get the IP address on the SLAN 22 for the CMIC 14.

This field is added by the CMIC 14 for event messages sent to it by the complexes and routed to the SLAN 22. It is also set by the Administration Console 12 as part of the destination address in a command event message.

System Number

This field specifies the system where the event message came from or is being sent to. The system name allows a listening agent to select event messages by system on a SLAN 22 that supports multiple systems. While recording the system name directly into every event message is not needed for event message distribution and selection on the SLAN 22 if multicast IP is supported, it is useful for sorting stored event messages for future analysis.

If multicast IP is not supported for command event messages, the CMIC 14 checks both the system and Cabinet 18 name in the command event message to determine if it needs to process this event message (otherwise, the CMIC 14 can drop the message and not ACK). This field is added by the CMIC 14 for event messages sent to it by the complexes and routed to the SLAN 22. It is also set by the Administration Console 12 as part of the destination address in a command event message.

Severity

This field specifies the severity of a critical information event message.

Data Portions

These fields contain data specific to the source complex for complex events and specific to the destination complex for command events.

ACK Messages

An ACK message contains the sequence number of the event message being ACK'ed and a status flag that indicates if the listening agent will be processing the event message itself. The processing of an event message may generate additional event messages being sent back to the sending agent (such as return status, or data).

The IP address of the agent issuing the ACK message. For remote proxies, this is the IP address of the final destination agent.

If the data portion contains a value of 0, then the event message does not apply to the agent responding with an ACK message to the sending agent. If the data portion contains a value greater than 0, then the value indicates the number of complexes to which the event message applies, e.g., the event is being processed or is being forwarded to "count" number of complex(es).

The number of ACKs and who transmits ACKs depends on the scope of the event message. Some messages are directed at a single agent or a group of agents. In the case of a single receiving agent, the sender will only expect an ACK from that agent. In the case of multiple receiving agents, an ACK would be expected from all receiving agents. An alternative is to use a series of point-to-point messages to the targeted agents.

Heartbeat Messages

Every sending and listening agent that has a direct connection to the SLAN 22 sends out a heartbeat if it wants to be an active participant in the message distribution system. There can be passive agents, if those agents do not need reliable delivery of event messages. The heartbeat includes the identity of the agent and the type of the agent.

Heartbeat messages also improve fault resilience through rapid failure detection. For example, the CMIC 14 and event loggers broadcast a heartbeat message periodically, so, if they suddenly fail, an agent such as the Administration Console 12 can signal an alert on the Console 12 display. Generally, the loss of a single heartbeat message will not generate an alert, but instead may result in the listening agent "pinging" the sending agent. Only after multiple instances where a heartbeat message was not received would the alert be raised.

A listening agent (like the Administration Console 12) would keep a list of sending agents (like CMICs 14) on a per system basis, based on the reception of their respective heartbeat messages. This way within some period, an Administration Console 12 would know the number of CMICs 14 associated with each system on the SLAN 22.

Once all the CMICs 14 are known, additional information about any system can be retrieved using commands to the CMICs 14. For example, once an Administration Console 12 knows all the CMICs 14, a request for internal status can be multicast to all the CMICs 14. Another use might be to compare a prior system topology information with a current actual topology, which would detect missing, new, or upgraded complexes.

Communications Method

Figure 3A:
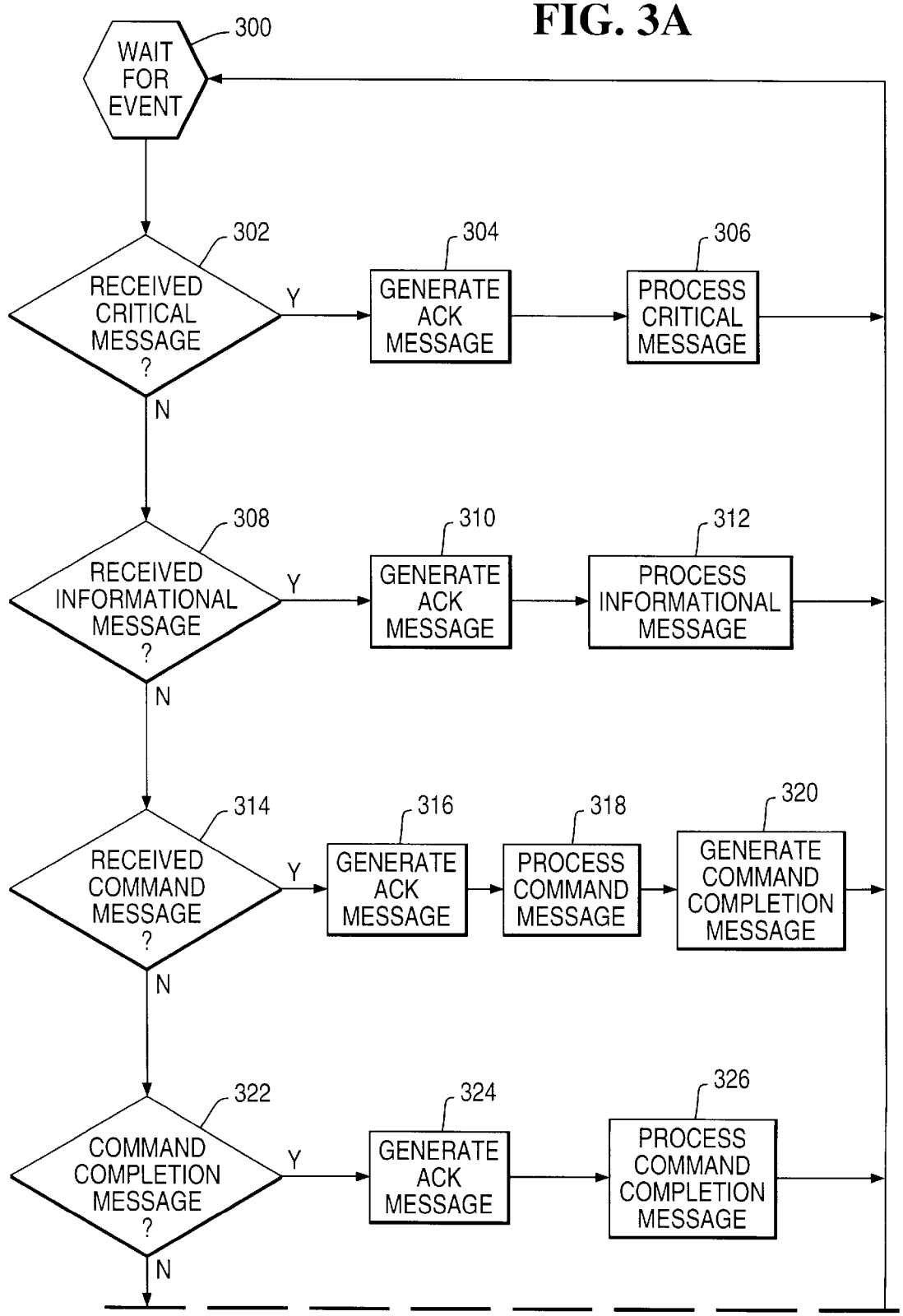
FIG. 3 is a flowchart that illustrates the steps that may be performed by an agent in receiving and/or sending messages.
Figure 3B:
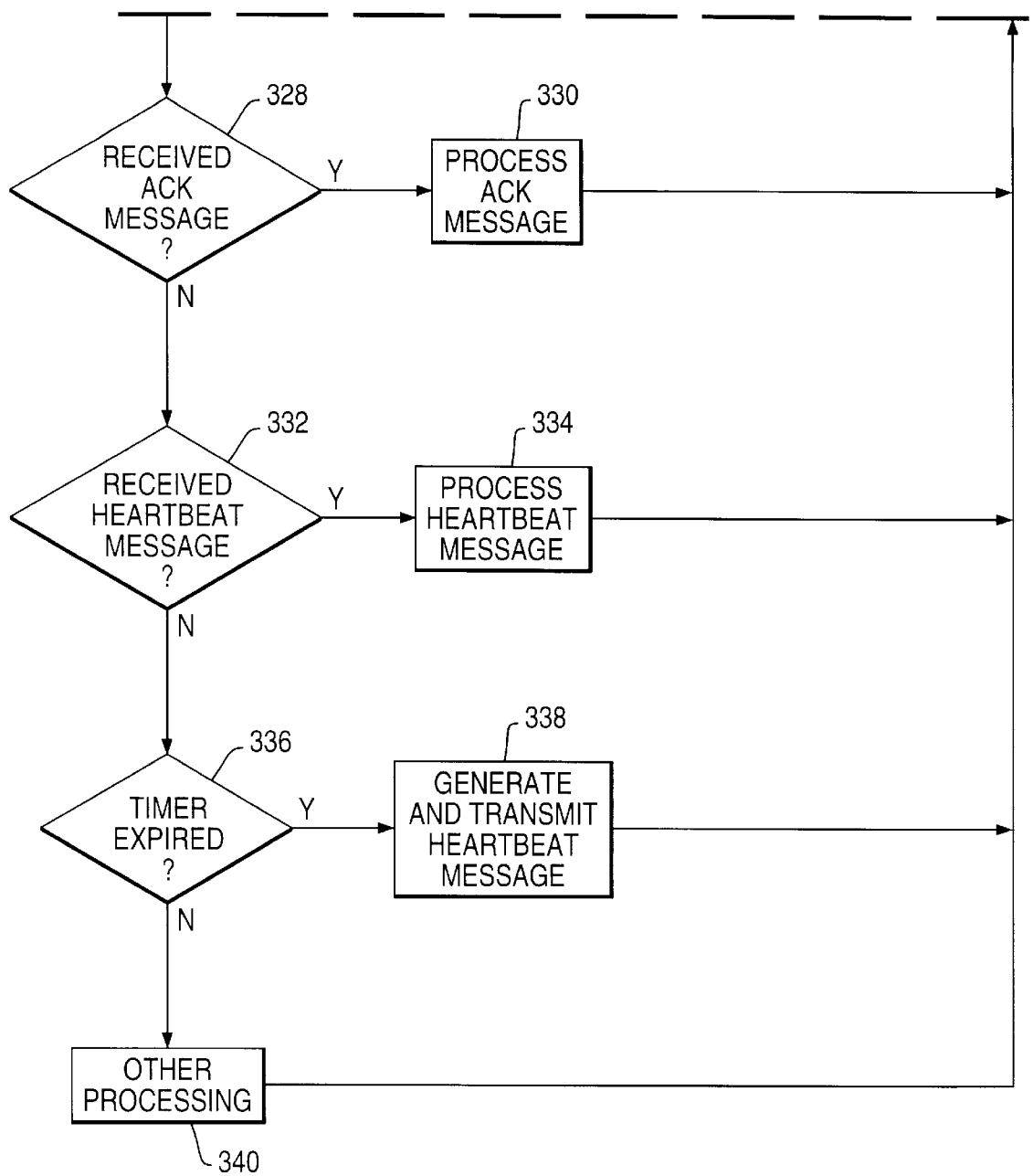

FIG. 3 is a flowchart that illustrates the steps 300–340 that may be performed by an agent in receiving and/or sending SLAN 22 messages. Block 300 represents the agent waiting for the next event to occur and Blocks 302–340 are performed once the event occurs. Note that every agent need not perform all the steps of 302–340, and that some agents will perform only a subset of the steps 302–340.

Block 302 is a decision block that represents the agent determining whether a critical event message was received. If so, control transfers to Block 304 to generate and transmit an ACK message to the sending agent and to Block 306 to process the critical event message. Thereafter, control transfers back to Block 300.

Block 308 is a decision block that represents the agent determining whether an informational event message was received. If so, control transfers to Block 310 to generate and transmit an ACK message to the sending agent and to Block 312 to process the informational event message. Thereafter, control transfers back to Block 300.

Block 314 is a decision block that represents the agent determining whether a command event message was received. If so, control transfers to Block 316 to generate and transmit an ACK message to the sending agent, to Block 318 to process the command event message, and then (optionally) to Block 320 to generate and transmit a command completion event message back to the sending agent. Thereafter, control transfers back to Block 300.

Block 322 is a decision block that represents the agent determining whether a command completion event message was received. If so, control transfers to Block 324 to generate and transmit an ACK message to the sending agent and to Block 326 to process the command completion event message. Thereafter, control transfers back to Block 300.

Block 328 is a decision block that represents the agent determining whether an ACK message was received. If so, control transfers to Block 330 to process the ACK message. Thereafter, control transfers back to Block 300.

Block 332 is a decision block that represents the agent determining whether a heartbeat message was received. If so, control transfers to Block 334 to process the heartbeat message. Thereafter, control transfers back to Block 300.

Block 336 is a decision block that represents the agent determining whether a timer expired. If so, control transfers to Block 338 to generate and transmit a heartbeat message. Thereafter, control transfers back to Block 300.

Conclusion

In summary, the present invention discloses a distributed service subsystem that comprises one or more cabinets containing one or more computer systems, one or more administration consoles for controlling the computer systems in the cabinets, and a network interconnecting the administration consoles and the cabinets. Each of the cabinets includes a cabinet module interface controller (CMIC) coupled to and controlling one or more chassis management boards (CMBs). The CMBs are each adapted to communicate with one or more managed components in the cabinet through a component specific interface.

The Distributed Service Subsystem 10 of the present invention has the following design goals:

1. Distribute events as widely as possible by allowing any complex or component 20 to receive every event.

2. It is the responsibility of the listening agent to decide what, if anything, to do with a received event. The sending agent does not know or care who wants the event. The listening agent can be located anywhere events can be heard and can operate on any events without restriction.

3. The cost of event distribution does not depend on system size or the number of systems being managed. Adding listening and sending agents is transparent to all other agents (both sending and listening).

4. The Distributed Service Subsystem 10 includes hardware and software that allows any complex to act as both an event sending and listening agent without requiring modification to the complex itself. This implies that, for complexes which cannot act as an event sender themselves, a proxy distribution mechanism is provided by the platform management system.

5. A failure in the Distributed Service Subsystem 10 only effects the distribution and handling of events, and does not reduce system availability or cause the loss of customer data.

6. As the size of the system increases, the performance of the Distributed Service Subsystem 10 scales proportionally without costly upgrades to components 20

7. Listening agents can be placed on any component 20 that has access to the distribution network, and they do not have to be centralized on a single node (like the Administration Console 12). Each agent has full access to every system event regardless of where they are located (so each Administration Console 12 connected to the network would have the same consistent single operational view).

8. Concurrent management agents (e.g., multiple Administration Consoles 12) are supported and can be distributed across the SLAN 22.

It is important when reading this specification to keep in mind that the design goals of the Distributed Service Subsystem 10 is to provide fault resilient operation, not fault tolerant operation. Failure of Distributed Service Subsystem 10 components may cause a loss of some functions and events, but will never cause the application or data to be placed at risk.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A Distributed Service Subsystem for managing one or more Computer Systems, comprising:

one or more Complexes residing in one or more of the Cabinets containing one or more Managed Components of one or more Computer Systems, wherein each Complex is a collection of related Managed Components and a set of the Cabinets are grouped into a combination of one or more interconnected Complexes;

one or more Administration Consoles, interconnected with the Cabinets by a Systems Management Network, for controlling the Computer Systems in the Cabinets;

each Cabinet including a Cabinet Module Interface Controller (CMIC) coupled to one or more Chassis Management Boards (CMBs), wherein the CMIC and CMBs each comprise embedded controllers that are configured in a hierarchy within the Cabinet;

each CMB being separate from but adapted to communicate with one or more of the Managed Components through a specific interface to the Managed Component, thereby precluding the need for the Managed Components themselves to adapt to the Distributed Service Subsystem; and each CMIC offloading management functions from the Administration Console coupled thereto by the Systems Management Network, and isolating the CMBs and Managed Components of a Cabinet from the rest of the Distributed Service Subsystem.

2. The Distributed Service Subsystem of claim 1 above, wherein the CMIC adds identity information to each event communicated from the Cabinet and then broadcasts the event over the Systems Management Network.

3. The Distributed Service Subsystem of claim 2 above, wherein the identity information comprises one or more items selected from a group comprising Cabinet identifier, Complex identifiers, Complex type, time stamp, and Computer System name.

4. The Distributed Service Subsystem of claim 1 above, wherein the Administration Console distributes management functions to the CMICs and CMBs by issuing management commands on the Systems Management Network to the CMICs.

5. The Distributed Service Subsystem of claim 1 above, wherein the Systems Management Network supports a connectionless-style of communication among the Administration Consoles and the CMICs.

6. The Distributed Service Subsystem of claim 1 above, wherein the CMIC communicates with the Administration Console as both a sending and receiving agent.

7. The Distributed Service Subsystem of claim 1 above, wherein the CMIC transmits event information to the Admiration Console to alert an operator of a change in status.

8. The Distributed Service Subsystem of claim 1 above, wherein the CMIC receives command information from the Administration Console to control the Managed Components in the Cabinet via the CMBs.

9. The Distributed Service Subsystem of claim 1 above, wherein the Administration Console routes command information to one or more Computer Systems via appropriate CMICs using one or more communication methods selected from a group comprising point-to-point, broadcast, and multi-cast communications.

10. The Distributed Service Subsystem of claim 1 above, wherein the CMIC converts the command information into a specific language of the Managed Component, and then routes the command information to the CMBs specified by the command information for communication via the specific interface to the Managed Component.

11. A Distributed Service Subsystem for managing one or more Computer Systems, comprising:

one or more Cabinets containing one or more Managed Components of one or more Computer Systems;

one or more Administration Consoles, interconnected with the Cabinets by a Systems Management Network, for controlling the Computer Systems in the Cabinets;

each Cabinet including a Cabinet Module Interface Controller (CMIC) coupled to one or more Chassis Management Boards (CMBs), wherein the CMIC and CMBs comprise embedded controllers that are configured in a hierarchy within the Cabinet;

each CMB being separate from hut adapted to communicate with one or more of the Managed Components through a specific interface to the Managed Component, thereby precluding the need for the Managed Components themselves to adapt to the Distributed Service Subsystem; and each CMIC offloading management functions from the Administration Console coupled thereto by the Systems Management Network, and isolating the CMBs and Managed Components of a Cabinet from the rest of the Distributed Service Subsystem.

12. A Distributed Service Subsystem for managing one or more Computer Systems, comprising:

one or more Complexes residing in one or more of the Cabinets containing one or more Managed Components of one or more Computer Systems, wherein each Complex is a collection of related Managed Components;

one or more Administration Consoles, interconnected with the Cabinets by a Systems Management Network, for controlling the Computer Systems in the Cabinets;

each Cabinet including a Cabinet Module Interface Controller (CMIC) coupled to one or more Chassis Management Boards (CMBs), wherein the CMIC and CMBs comprise embedded controllers that are configured in a hierarchy within the Cabinet;

each CMB being separate from but adapted to communicate with one or more of the Managed Components through a specific interface to the Managed Component, thereby precluding the need for the Managed Components themselves to adapt to the Distributed Service Subsystem; and each CMIC offloading management functions from the Administration Console coupled thereto by the Systems Management Network, and isolating the CMBs and Managed Components of a Cabinet from the rest of the Distributed Service Subsystem.

* * * * *